(12) United States Patent
Pouran Ben Veyseh et al.

(10) Patent No.: US 11,893,345 B2
(45) Date of Patent: Feb. 6, 2024

(54) INDUCING RICH INTERACTION STRUCTURES BETWEEN WORDS FOR DOCUMENT-LEVEL EVENT ARGUMENT EXTRACTION

(71) Applicant: ADOBE INC., San Jose, CA (US)

(72) Inventors: Amir Pouran Ben Veyseh, Eugene, OR (US); Franck Dernoncourt, San Jose, CA (US); Quan Tran, San Jose, CA (US); Varun Manjunatha, Newton, MA (US); Lidan Wang, San Jose, CA (US); Rajiv Jain, Vienna, VA (US); Doo Soon Kim, San Jose, CA (US); Walter Chang, San Jose, CA (US)

(73) Assignee: ADOBE, INC., San Jose, CA (US)

( * ) Notice: Subject to any disclaimer, the term of this patent is extended or adjusted under 35 U.S.C. 154(b) by 247 days.

(21) Appl. No.: 17/223,166

(22) Filed: Apr. 6, 2021

(65) Prior Publication Data
US 2022/0318505 A1     Oct. 6, 2022

(51) Int. Cl.
*G06F 40/284* (2020.01)
*G06F 40/211* (2020.01)
(Continued)

(52) U.S. Cl.
CPC .......... *G06F 40/284* (2020.01); *G06F 40/126* (2020.01); *G06F 40/211* (2020.01);
(Continued)

(58) Field of Classification Search
CPC .... G06F 40/284; G06F 40/126; G06F 40/211; G06F 40/30; G06N 3/045; G06N 3/044; G06N 3/08
See application file for complete search history.

(56) References Cited

U.S. PATENT DOCUMENTS

2020/0387574 A1   12/2020   Min et al.
2021/0271822 A1    9/2021   Bui et al.
(Continued)

OTHER PUBLICATIONS

Ebner, Seth, Patrick Xia, Ryan Culkin, Kyle Rawlins, and Benjamin Van Durme, "Multi-Sentence Argument Linking", Jul. 2020, Proceedings of the 58th Annual Meeting of the Association for Computational Linguistics, pp. 8057-8077. (Year: 2020).*
(Continued)

*Primary Examiner* — Daniel C Washburn
*Assistant Examiner* — James Boggs
(74) *Attorney, Agent, or Firm* — F. CHAU & ASSOCIATES, LLC

(57) ABSTRACT

Systems and methods for natural language processing are described. One or more embodiments of the present disclosure receive a document comprising a plurality of words organized into a plurality of sentences, the words comprising an event trigger word and an argument candidate word, generate word representation vectors for the words, generate a plurality of document structures including a semantic structure for the document based on the word representation vectors, a syntax structure representing dependency relationships between the words, and a discourse structure representing discourse information of the document based on the plurality of sentences, generate a relationship representation vector based on the document structures, and predict a relationship between the event trigger word and the argument candidate word based on the relationship representation vector.

20 Claims, 6 Drawing Sheets

(51) Int. Cl.
  *G06F 40/30* (2020.01)
  *G06N 3/08* (2023.01)
  *G06F 40/126* (2020.01)
  *G06N 3/044* (2023.01)
  *G06N 3/045* (2023.01)

(52) U.S. Cl.
  CPC ............. *G06F 40/30* (2020.01); *G06N 3/044* (2023.01); *G06N 3/045* (2023.01); *G06N 3/08* (2013.01)

(56) References Cited

U.S. PATENT DOCUMENTS

| | | |
|---|---|---|
| 2021/0295095 A1 | 9/2021 | Pan et al. |
| 2021/0365306 A1 | 11/2021 | Haldar et al. |
| 2022/0004714 A1 | 1/2022 | Li et al. |
| 2022/0050967 A1 | 2/2022 | Veyseh et al. |
| 2023/0127652 A1 | 4/2023 | Pouran Ben Veyseh et al. |

OTHER PUBLICATIONS

Veyseh, Amir Pouran Ben, Tuan Ngo Nguyen, and Thien Huu Nguyen, "Graph Transformer Networks with Syntactic and Semantic Structures for Event Argument Extraction", Nov. 2020, Findings of the Association for Computational Linguistics: EMNLP 2020, pp. 3651-3661. (Year: 2020).*
Liu, Yang, Furu Wei, Sujian Li, Heng Ji, Ming Zhou, and Houfeng Wang, "A Dependency-Based Neural Network for Relation Classification", Jul. 2015, Proceedings of the 53rd Annual Meeting of the Association for Computational Linguistics (ACL-IJCNLP 2015), pp. 285-290. (Year: 2015).*
Patwardhan, Siddharth, and Ted Pedersen, "Using WordNet-based Context Vectors to Estimate the Semantic Relatedness of Concepts", Apr. 2006, Proceedings of the EACL 2006 Workshop on Making Sense of Sense: Bringing Computational Linguistics and Psycholinguistics Together. (Year: 2006).*
Pedersen, Ted, Siddharth Patwardhan, and Jason Michelizzi, "WordNet:: Similarity-Measuring the Relatedness of Concepts", May 2004, HLT-NAACL—Demonstrations '04: Demonstration Papers at HLT-NAACL 2004. (Year: 2004).*
Chambers, Nathanael, and Dan Jurafsky, "Template-Based Information Extraction without the Templates", Jun. 2011, Proceedings of the 49th Annual Meeting of the Association for Computational Linguistics, pp. 976-986. (Year: 2011).*
Yoshikawa, Katsumasa, Sebastian Riedel, Tsutomu Hirao, Masayuki Asahara, and Yuji Matsumoto, "Coreference Based Event-Argument Relation Extraction on Biomedical Text", Oct. 2011, Journal of Biomedical Semantics 2011, 2(Suppl 5):S6, pp. 1-14. (Year: 2011).*
Veyseh, Amir Pouran Ben, Franck Dernoncourt, Quan Tran, Varun Manjunatha, Lidan Wang, Rajiv Jain, Doo Soon Kim, Walter Chang, and Thien Huu Nguyen, "Inducing Rich Interaction Structures Between Words for Document-Level Event Argument Extraction", May 2021, PAKDD 2021, pp. 703-715. (Year: 2021).*
1Ahn, "The stages of event extraction", In Proceedings of the Workshop on Annotating and Reasoning about Time and Events, 2006, 8 pages.
2Balachandran, et al., "StructSum: Incorporating Latent and Explicit Sentence Dependencies for Single Document Summarization", In arXiv preprint arXiv:2003.00576v1 [cs.CL] Mar. 1, 2020, 11 pages.
3Blevins, et al., "Moving Down the Long Tail of Word Sense Disambiguation with Gloss Informed Bi-encoders", In arXiv preprint arXiv:2005.02590v2 [cs.CL] Jun. 2, 2020, In ACL, 12 pages.
4Chen, et al., "Automatically Labeled Data Generation for Large Scale Event Extraction", In Proceedings of the 55th Annual Meeting of the Association for Computational Linguistics, 2017, pp. 409-419.
5Chen, et al., "Event Extraction via Dynamic Multi-Pooling Convolutional Neural Networks", In Proceedings of the 53rd Annual Meeting of the Association for Computational Linguistics and the 7th International Joint Conference on Natural Language Processing, pp. 167-176, 2015.
6Christopoulou, et al., "Connecting the Dots: Document-level Neural Relation Extraction with Edge-oriented Graphs", In EMNLP, In arXiv preprint arXiv:1909.00228v1 [cs.CL] Aug. 31, 2019, 12 pages.
7Devlin, et al., "BERT: Pre-training of Deep Bidirectional Transformers for Language Understanding", In EMNLP, In arXiv preprint arXiv:1810.04805v2 [cs.CL] May 24, 2019, 16 pages.
8Du, et al., "Document-Level Event Role Filler Extraction using Multi-Granularity Contextualized Encoding", In ACL, In arXiv preprint arXiv:2005.06579v1 [cs.CL] May 13, 2020, 12 pages.
9Du, et al., "Document-level Event-based Extraction Using Generative Template-filling Transformers", In arXiv preprint arXiv:2008.09249v1 [cs.CL] Aug. 21, 2020, 13 pages.
10Ebner, et al., "Multi-Sentence Argument Linking", In ACL, In arXiv preprint arXiv:1911.03766v3 [cs.CL] May 9, 2020, 21 pages.
11Feizabadi, et al., "Combining Seemingly Incompatible Corpora for Implicit Semantic Role Labeling", Proceedings of the Fourth Joint Conference on Lexical and Computational Semantics (*SEM 2015), pp. 40-50.
12Gerber, et al., "Beyond NomBank: A Study of Implicit Arguments for Nominal Predicates", In ACL, 2010, Proceedings of the 48th Annual Meeting of the Association for Computational Linguistics, pp. 1583-1592.
13Gerber, et al., "Semantic Role Labeling of Implicit Arguments for Nominal Predicates", In Computational Linguistics, 2012, 44 pages.
14Gorinski, et al., "Towards Weakly Supervised Resolution of Null Instantiations", In Proceedings of the 10th International Conference on Computational Semantics (IWCS 2013)—Long Papers—Association for Computational Linguistics, 2013, pp. 119-130.
15Gupta, et al., "Neural Relation Extraction within and across Sentence Boundaries", In the Thirty-Third AAAI Conference on Artificial Intelligence (AAAI-19), 2019, pp. 6513-6520.
16He, et al., "Jointly Predicting Predicates and Arguments in Neural Semantic Role Labeling", In Proceedings of the 56th Annual Meeting of the Association for Computational Linguistics (Short Papers), 2018, pp. 364-369.
17Hong, et al., "Using Cross-Entity Inference to Improve Event Extraction", In Proceedings of the 49th Annual Meeting of the Association for Computational Linguistics, pp. 1127-1136, 2011.
18Ji, et al., "Refining Event Extraction through Cross-document Inference", In Proceedings of ACL-08: HLT, 2008, pp. 254-262.
19Kipf, et al., "Semi-Supervised Classification With Graph Convolutional Networks", In ICLR, In arXiv preprint arXiv:1609.02907v4 [cs.LG] Feb. 22, 2017, 14 pages.
20Laparra, et al., "Sources of Evidence for Implicit Argument Resolution", In IWCS, 2013, 11 pages.
21Le, et al., "Neural Models of Selectional Preferences for Implicit Semantic Role Labeling", In the Eleventh International Conference on Language Resources and Evaluation, 2018, pp. 3062-3067.
22Lee, et al., "Higher-order Coreference Resolution with Coarse-to-fine Inference", In Proceedings of NAACL-HLT 2018, 2018, pp. 687-692.
23Li, et al., "Joint Event Extraction via Structured Prediction with Global Features", In ACL, 2013, 10 pages.
24Liao, et al., "Filtered Ranking for Bootstrapping in Event Extraction", In COLING, 2010a, 9 pages.
25Liao, et al., "Using Document Level Cross-Event Inference to Improve Event Extraction". In Proceedings of the 48th Annual Meeting of the Association for Computational Linguistics, pp. 789-797, 2010b.
26Lin, et al., "An Information-Theoretic Definition of Similarity", In ICML, 1998, 9 pages.
27McClosky, et al., "Event Extraction as Dependency Parsing", Event Extraction as Dependency Parsing, In BioNLP Shared Task Workshop, 2011, 10 pages.
28Miller, "WordNet: A Lexical Database for English", In Communications of the ACM, Nov. 1995/vol. 38, No. 11, pp. 39-41.

(56) References Cited

OTHER PUBLICATIONS

29Miwa, et al., "Comparable Study of Event Extraction in Newswire and Biomedical Domains", In Proceedings of COLING 2014, the 25th International Conference on Computational Linguistics: Technical Papers, pp. 2270-2279.
30Nan, et al., "Reasoning with Latent Structure Refinement for Document-Level Relation Extraction", In Proceedings of the 58th Annual Meeting of the Association for Computational Linguistics, pp. 1546-1557, 2020.
31Nguyen, et al., "Joint Event Extraction via Recurrent Neural Networks", In Proceedings of NAACL-HLT 2016, pp. 300-309.
32Nguyen, et al., "Event Detection and Domain Adaptation with Convolutional Neural Networks", In Proceedings of the 53rd Annual Meeting of the Association for Computational Linguistics and the 7th International Joint Conference on Natural Language Processing (Short Papers), pp. 365-371, 2015.
33Ouchi, et al., "A Span Selection Model for Semantic Role Labeling", In Proceedings of the 2018 Conference on Empirical Methods in Natural Language Processing, pp. 1630-1642.
34Pan, et al., "Semantic Graphs for Generating Deep Questions", In ACL, 2020, 13 pages.
35Patwardhan, et al., "A Unified Model of Phrasal and Sentential Evidence for Information Extraction", In EMNLP, 2009, 10 pages.
36Pennington, et al., "GloVe: Global Vectors for Word Representation", In EMNLP, 2014, 12 pages.
37Qiu, et al., "Machine Reading Comprehension Using Structural Knowledge Graph-aware Network", In Proceedings of the 2019 Conference on Empirical Methods in Natural Language Processing and the 9th International Joint Conference on Natural Language Processing, pp. 5896-5901.
38Riedel, et al., "Robust Biomedical Event Extraction with Dual Decomposition and Minimal Domain Adaptation", In Proceedings of BioNLP Shared Task 2011 Workshop, pp. 46-50.
39Ruppenhofer, et al., "SemEval-2010 Task 10: Linking Events and Their Participants in Discourse", In Proceedings of the 5th International Workshop on Semantic Evaluation, ACL 2010, pp. 45-50.
40Sahu, et al., Inter-sentence Relation Extraction with Document-level Graph Convolutional Neural Network, In Proceedings of the 57th Annual Meeting of the Association for Computational Linguistics, pp. 4309-4316, 2019.
41Schenk, et al., "Unsupervised Learning of Prototypical Fillers for Implicit Semantic Role Labeling", In Proceedings of NAACL-HLT 2016, pp. 1473-1479.
42Sha, et al., "Jointly Extracting Event Triggers and Arguments by Dependency-Bridge RNN and Tensor-Based Argument Interaction", In AAAI, 2018, pp. 5916-5923.
43Silberer, et al., "Casting Implicit Role Linking as an Anaphora Resolution Task", In First Joint Conference on Lexical and Computational Semantics (*SEM), pp. 1-10, 2012.
44Thayaparan, et al., "Identifying Supporting Facts for Multi-hop Question Answering with Document Graph Networks", In Proceedings of the Thirteenth Workshop on Graph-Based Methods for Natural Language Processing (TextGraphs-13), pp. 42-51, 2019.
45Vaswani, et al., "Attention Is All You Need", In 31st Conference on Neural Information Processing Systems (NIPS 2017), 11 pages.
46Wang, et al., "HMEAE: Hierarchical Modular Event Argument Extraction", In Proceedings of the 2019 Conference on Empirical Methods in Natural Language Processing and the 9th International Joint Conference on Natural Language Processing, pp. 5777-5783.
47Yang, et al., "Joint Extraction of Events and Entities within a Document Context", In NAACL-HLT, In arXiv preprint arXiv:1609.03632v1 [cs.CL] Sep. 12, 2016, 11 pages.
48Yang, et al., "Exploring Pre-trained Language Models for Event Extraction and Generation", In Proceedings of the 57th Annual Meeting of the Association for Computational Linguistics, pp. 5284-5294, 2019.
49Yun, et al., "Graph Transformer Networks", In 33rd Conference on Neural Information Processing Systems (NeurIPS 2019), In arXiv preprint arXiv:1911.06455v2 [cs.LG] Feb. 5, 2020, 11 pages.
50Zhang, et al., "Extracting Entities and Events as a Single Task Using a Transition-Based Neural Model", In Proceedings of the Twenty-Eighth International Joint Conference on Artificial Intelligence (IJCAI-19), 2019, pp. 5422-5428.
51Zhang, et al., "A Question Answering-Based Framework for One-Step Event Argument Extraction", In IEEE Access, vol. 8, 2020a, pp. 65420-65431.
52Zhang, et al., "Every Document Owns Its Structure: Inductive Text Classification via Graph Neural Networks", In arXiv preprint arXiv:2004.13826v2 [cs.CL] May 12, 2020, 6 pages.
53Zhang, et al., "A Two-Step Approach for Implicit Event Argument Detection", In Proceedings of the 58th Annual Meeting of the Association for Computational Linguistics, pp. 7479-7485, 2020c.
54Veyseh, et al., "Graph Transformer Networks with Syntactic and Semantic Structures for Event Argument Extraction", arXiv preprint arXiv:2010.13391v1 [cs.CL] Oct. 26, 2020, 11 pages.
Lee et al., "Effective Use of Graph Convolution Network and Contextual Sub-Tree for Commodity News Event Extraction", arXiv preprint arXiv:2109.12781 (Sep. 27, 2021).
Zhang et al., "Graph Convolution over Pruned Dependency Trees Improves Relation Extraction," arXiv preprint arXiv: 1809.10185, (Oct. 31-Nov. 4, 2018), 11 pages.
Dai et al., "Event argument extraction via a distance-sensitive graph convolutional network." Natural Language Processing and Chinese Computing: 10th CCF International Conference, N LPCC 2021, Qingdao, China, Oct. 13-17, 2021, Proceedings, Part II 10. Springer International Publishing, 2021. (Year: 2021).
Office Action dated Nov. 9, 2023 in corresponding U.S. Appl. No. 17/452,143.

* cited by examiner

INDUCING RICH INTERACTION STRUCTURES BETWEEN WORDS FOR DOCUMENT-LEVEL EVENT ARGUMENT EXTRACTION

BACKGROUND

The following relates generally to natural language processing, and more specifically to event argument extraction.

Natural language processing (NLP) refers to techniques for using computers to interpret natural language. In some cases, NLP tasks involve assigning annotation data such as grammatical information to words or phrases within a natural language expression. Different classes of machine learning algorithms have been applied to NLP tasks.

Event extraction is an NLP task that involves identifying instances of events in text. In some examples, event extraction involves a number of sub-tasks including entity detection, event detection, and event argument extraction. Entity detection refers to identifying entities such as people, objects, and places. Event detection refers to identifying events such as actions or moments referred to within a text. Event argument extraction refers to identifying the relationships between the entity mentions and the events (event participants and spatio-temporal attributes, collectively known as event arguments).

Conventionally, sentence-level event argument extraction is used to determine the relationship between an event trigger word and an argument candidate word in the same sentence. However, systems designed for sentence-level event argument extraction systems are not scalable to perform document-level event argument extraction, where an argument candidate word is located far from an event trigger word. There is a need in the art for improved event argument extraction systems that are scalable and efficient in document-level event argument extraction.

SUMMARY

The present disclosure describes systems and methods for natural language processing. One or more embodiments of the disclosure provide an event argument extraction apparatus trained using machine learning techniques to predict a relationship between an event trigger word and an argument candidate word based on a high-dimensional relationship representation vector. For example, an event argument extraction network may be trained for document-level event argument extraction and role prediction. The event argument extraction network leverages multiple sources of information to generate a set of document structures to provide sufficient knowledge for representation learning. In some examples, the set of document structures involve syntax, discourse, contextual semantic information. In some examples, a graph-based network is used to produce relatively rich document structures to enable multi-hop and heterogeneous interactions between words in a document.

A method, apparatus, and non-transitory computer readable medium for natural language processing are described. One or more embodiments of the method, apparatus, and non-transitory computer readable medium include receiving a document comprising a plurality of words organized into a plurality of sentences, the words comprising an event trigger word and an argument candidate word, generating word representation vectors for the words, generating a plurality of document structures including a semantic structure for the document based on the word representation vectors, a syntax structure representing dependency relationships between the words, and a discourse structure representing discourse information of the document based on the plurality of sentences, generating a relationship representation vector based on the document structures, and predicting a relationship between the event trigger word and the argument candidate word based on the relationship representation vector.

An apparatus and method for natural language processing are described. One or more embodiments of the apparatus and method include a document encoder configured to generate word representation vectors for words of a document organized into a plurality of sentences, the words comprising an event trigger word and an argument candidate word, a structure component configured to generate a plurality of document structures including a semantic structure for the document based on the word representation vectors, a syntax structure representing dependency relationships between the words, and a discourse structure representing discourse information of the document based on the plurality of sentences, a relationship encoder configured to generate a relationship representation vector based on the document structures, and a decoder configured to predict a relationship between the event trigger word and the argument candidate word based on the relationship representation vector.

A method, apparatus, and non-transitory computer readable medium for training a neural network are described. One or more embodiments of the method, apparatus, and non-transitory computer readable medium include receiving training data including documents comprising a plurality of words organized into a plurality of sentences, the words comprising an event trigger word and argument words, and the training data further including ground truth relationships between the event trigger word and the argument words, generating word representation vectors for the words, generating a plurality of document structures including a semantic structure based on the word representation vectors, a syntax structure representing dependency relationships between the words, and a discourse structure representing discourse information based on the plurality of sentences, generating relationship representation vectors based on the document structures, predicting relationships between the event trigger word and the argument candidate words based on the relationship representation vectors, computing a loss function by comparing the predicted relationships to the ground truth relationships, and updating parameters of a neural network based on the loss function.

DETAILED DESCRIPTION

Figure 1:
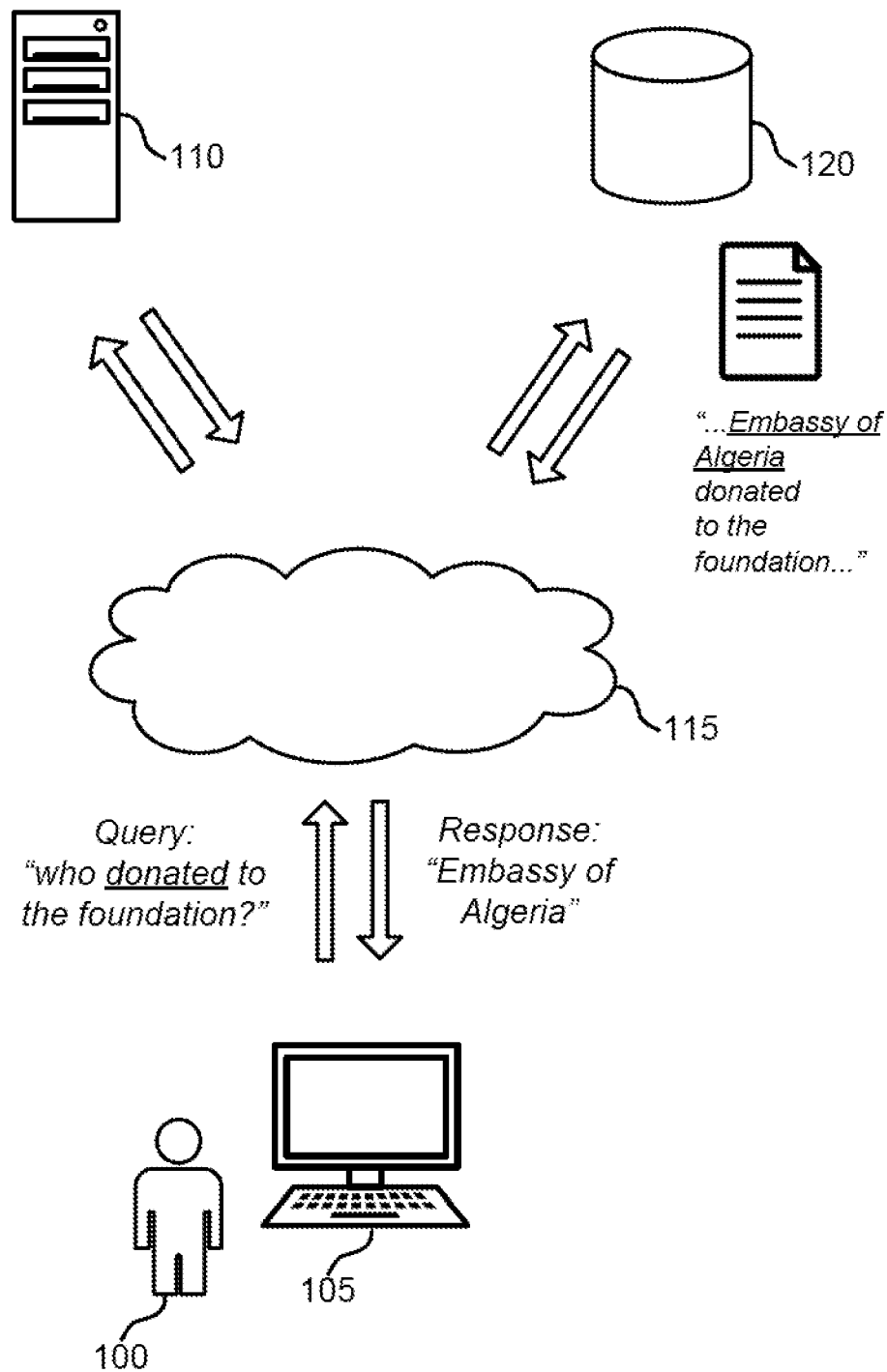
FIG. 1 shows an example of a system for natural language processing according to aspects of the present disclosure.

The present disclosure describes systems and methods for natural language processing. One or more embodiments of the disclosure provide an event argument extraction apparatus trained using machine learning techniques to predict a relationship between an event trigger word and an argument candidate word based on a high-dimensional relationship representation vector. For example, an event argument extraction network may be trained for document-level event argument extraction and role prediction. The event argument extraction network leverages multiple sources of information to generate a set of document structures to provide sufficient knowledge for representation learning. In some examples, the set of document structures involve syntax, discourse, contextual semantic information, and an external knowledge base (e.g., WordNet). Additionally, a graph-based network such as a graph transformer network (GTN) may be used to produce relatively rich document structures to enable multi-hop and heterogeneous interactions between words in a document.

Recently, event argument extraction systems have been developed that focus on sentence-level event argument extraction, where event trigger words and argument candidate words are presented in a same sentence (i.e., document structures are not considered on a document-level in training). However, conventional event argument extraction systems do not incorporate external knowledge when generating document structures, and fail to combine multiple structures from different sources of information for multi-hop heterogeneous reasoning.

One or more embodiments of the present disclosure provide an improved event argument extraction apparatus that can perform document-level event argument extraction tasks, including tasks where event trigger words and argument candidate words belong to different sentences in multiple documents. In some examples, the event argument extraction network includes a deep neural network that generates document structures based on multiple sources of information such as syntax, semantic and discourse. According to one embodiment, a graph transformer network (GTN) is used to combine these document structures.

By applying the unconventional step of generating multiple document structures, one or more embodiments of the present disclosure provide an event argument extraction network that can perform efficient event argument extraction at a document level. The improved network is scalable to scenarios where an event trigger word and an argument candidate word are located far from each other in different sentences or documents. In some cases, a supervised training approach may be used to train the event argument extraction network. As a result, the improved network can extract arguments of event mentions over one or more documents to provide a complete view of information for events in these documents.

Embodiments of the present disclosure may be used in the context of information extraction, knowledge base construction, and question answering applications. For example, an event argument extraction network based on the present disclosure may be used to predict a relationship between an event trigger word and an argument candidate word. In some examples, the event trigger word and the argument candidate word belong to different sentences in multiple documents (i.e., document-level event argument extraction). An example of an application of the inventive concept in the question answering context is provided with reference to FIGS. 1 and 2. Details regarding the architecture of an example event argument extraction apparatus are provided with reference to FIGS. 3 and 4. An example of a process for natural language processing are provided with reference to FIG. 5. A description of an example training process is described with reference to FIG. 6.

Question Answering Application

FIG. 1 shows an example of a system for natural language processing according to aspects of the present disclosure. The example shown includes user 100, user device 105, event argument extraction apparatus 110, cloud 115, and database 120.

In the example of FIG. 1, the user 100 provide a query to the event argument extraction apparatus 110, e.g., via the user device 105 and the cloud 115. Additionally, the event argument extraction apparatus 110 receives a document comprising a set of words organized into a set of sentences, the words comprising an event trigger word and an argument candidate word. For example, the query is "who donated to the foundation?". In this example, "donated" may be recognized as an event trigger word.

The event argument extraction apparatus 110 includes a trained event argument extraction network having a document encoder, which generates word representation vectors for the words. The event argument extraction network generates a set of document structures using a structure component. The set of document structures include a semantic structure for the document based on the word representation vectors, a syntax structure representing dependency relationships between the words, and a discourse structure representing discourse information of the document based on the set of sentences. The event argument extraction network generates a relationship representation vector based on the document structures.

Accordingly, the event argument extraction apparatus 110 predicts a relationship between the event trigger word and the argument candidate word based on the relationship representation vector. In the example above, the event argument extraction network identifies an entity mention (i.e., Embassy of Algeria) as an argument candidate word for the event trigger word (i.e., donated) found in the query. The event argument extraction apparatus 110 returns the predicted answer to the user 100, e.g., via the user device 105 and the cloud 115.

The user device 105 may be a personal computer, laptop computer, mainframe computer, palmtop computer, personal assistant, mobile device, or any other suitable processing apparatus. In some examples, the user device 105 includes software that incorporates an event argument extraction or a question answering application (e.g., a dialogue system). The question answering application may either include or communicate with the event argument extraction apparatus 110.

The event argument extraction apparatus 110 includes a computer implemented network comprising a document encoder, a structure component, a relationship encoder, and a decoder. The network generates word representation vectors for words of a document organized into a plurality of sentences using a document encoder, the words comprising an event trigger word and an argument candidate word. The network generates a plurality of document structures including a semantic structure for the document based on the word representation vectors, a syntax structure representing dependency relationships between the words, and a discourse structure representing discourse information of the document based on the plurality of sentences using a structure component. The network generates a relationship representation vector based on the document structures using a relationship encoder. The network predicts a relationship between the event trigger word and the argument candidate word based on the relationship representation vector using a decoder.

The event argument extraction apparatus 110 may also include a processor unit, a memory unit, and a training component. The training component is used to train the event argument extraction (EAE) network. Additionally, the event argument extraction apparatus 110 can communicate with the database 120 via the cloud 115. In some cases, the architecture of the event argument extraction network is also referred to as a network model or an EAE network. Further detail regarding the architecture of the event argument extraction apparatus 110 is provided with reference to FIGS. 3 and 4. Further detail regarding the operation of the event argument extraction apparatus 110 is provided with reference to FIG. 5.

In some cases, the event argument extraction apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

A cloud 115 is a computer network configured to provide on-demand availability of computer system resources, such as data storage and computing power. In some examples, the cloud 115 provides resources without active management by the user. The term cloud 115 is sometimes used to describe data centers available to many users over the Internet. Some large cloud networks have functions distributed over multiple locations from central servers. A server is designated an edge server if it has a direct or close connection to a user. In some cases, a cloud 115 is limited to a single organization. In other examples, the cloud is available to many organizations. In one example, a cloud 115 includes a multi-layer communications network comprising multiple edge routers and core routers. In another example, a cloud 115 is based on a local collection of switches in a single physical location.

A database 120 is an organized collection of data (e.g., a corpus of documents to be searched). For example, a database 120 stores data in a specified format known as a schema. A database 120 may be structured as a single database, a distributed database, multiple distributed databases, or an emergency backup database. In some cases, a database controller may manage data storage and processing in a database 120. In some cases, a user interacts with database controller. In other cases, database controller may operate automatically without user interaction.

Figure 2:
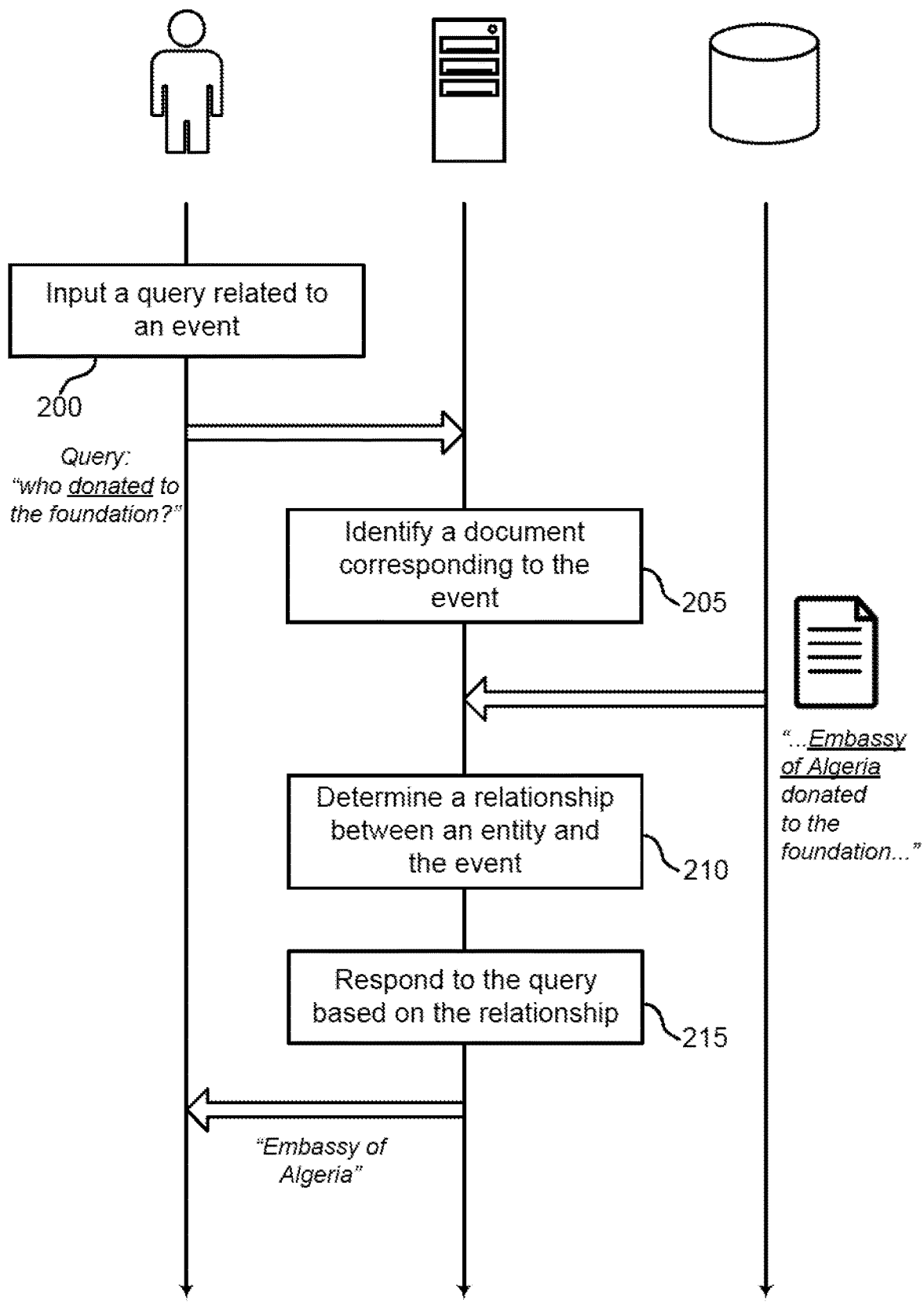
FIG. 2 shows an example of a dialogue process for event argument extraction according to aspects of the present disclosure.

FIG. 2 shows an example of a dialogue process using event argument extraction according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 200, the user inputs a query related to an event. In an example, the query is "who donated to the foundation?". The word "donated" may be recognized by an event argument extraction system as an event trigger word. In some cases, the operations of this step refer to, or may be performed by, a user operating a user device as described with reference to FIG. 1.

At operation 205, the system identifies a document corresponding to the event. In some cases, the operations of this step refer to, or may be performed by, a database as described with reference to FIG. 1.

According to an example, the text of a document includes "the foundation said that immediately following the Haitian earthquake, the Embassy of Algeria provided an unsolicited lump-sum fund to the foundation's relief plan. This was a one-time, specific donation to help Haiti and it had donated twice to the Clinton Foundation before."

At operation 210, the system determines a relationship between an entity and the event. In some cases, the operations of this step refer to, or may be performed by, an event argument extraction apparatus as described with reference to FIG. 1.

In the above example document, the system recognizes the entity mention (i.e., Embassy of Algeria) as an argument (of role giver) for an event mention associated with an event trigger word (i.e., "donated"). The system utilizes the coreference link between the entity mention (Embassy of Algeria) and a pronoun "it" (i.e., discourse information) that can be directly connected with the trigger word (i.e., "donated") using an edge in the syntactic dependency tree of the second sentence to reach this reasoning. Alternatively, if a coreference link is not found or obtained (e.g., due to errors in the coreference resolution systems), the system can rely on close semantic similarity between the event trigger word ("donated") and the phrase (i.e., "provided an unsolicited lump-sum fund") that may be linked to the entity mention or an argument candidate word (i.e., Embassy of Algeria) using a dependency edge for the first sentence. The system is configured as a document-level EAE model that can jointly capture information from syntax, semantic, and discourse structures to sufficiently encode important interactions between words for event argument extraction.

At operation 215, the system responds to the query based on the relationship. According to the example above, the system provides an answer to the query, "Embassy of Algeria". Therefore, the user would understand it is Embassy of Algeria that donated to the foundation. In some cases, the user can modify the query and the system generates an updated response based on the modified query. In some cases, the operations of this step refer to, or may be performed by, a user device as described with reference to FIG. 1.

Network Architecture

Figure 3:
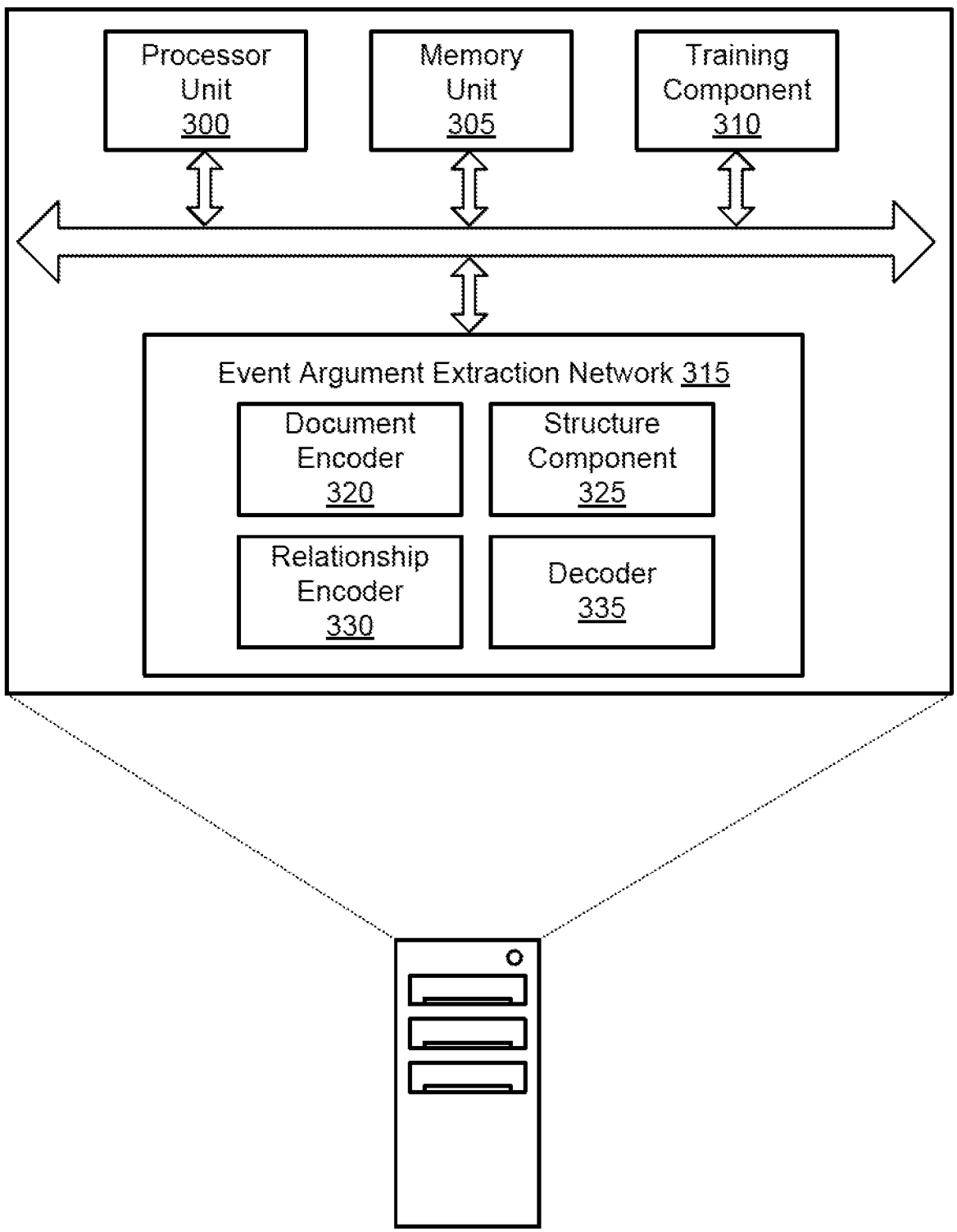
FIG. 3 shows an example of an event argument extraction apparatus according to aspects of the present disclosure.
Figure 4:
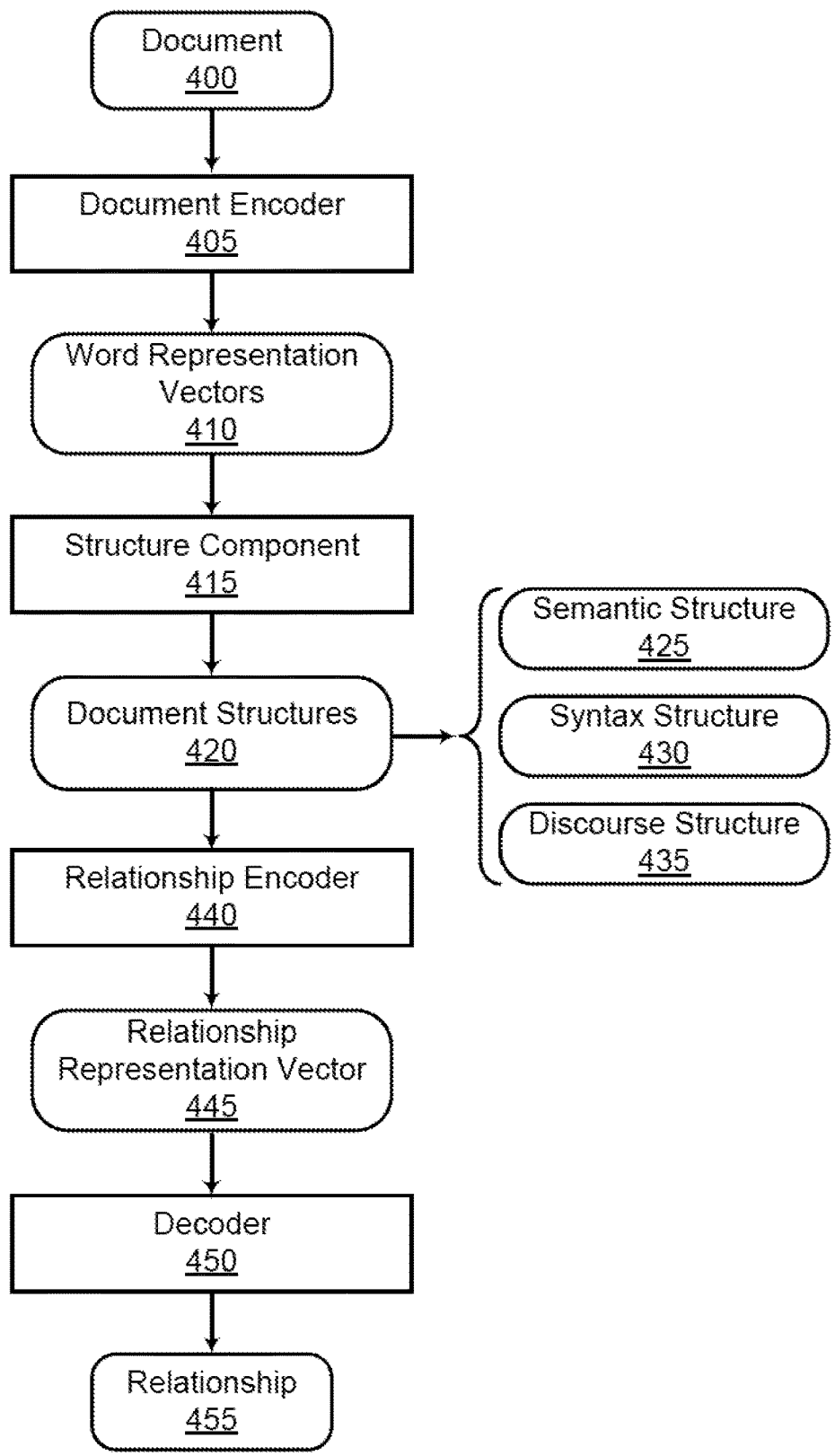
FIG. 4 shows an example of an event argument extraction network according to aspects of the present disclosure.

In FIGS. 3-4, an apparatus and method for natural language processing are described. One or more embodiments of the apparatus and method include a document encoder configured to generate word representation vectors for words of a document organized into a plurality of sentences, the words comprising an event trigger word and an argument candidate word, a structure component configured to generate a plurality of document structures including a semantic structure for the document based on the word representation vectors, a syntax structure representing dependency relationships between the words, and a discourse structure representing discourse information of the document based on the plurality of sentences, a relationship encoder configured to generate a relationship representation vector based on the document structures, and a decoder configured to predict a relationship between the event trigger word and the argument candidate word based on the relationship representation vector.

In some examples, the document encoder comprises a word encoder, a position embedding table, and an LSTM. In some examples, the structure component comprises a lexical database, a dependency parser, and a coreference network. In some examples, the relationship encoder comprises a GTN and a graph convolution network (GCN). In some examples, the decoder comprises a feed-forward layer and a softmax layer.

FIG. 3 shows an example of an event argument extraction apparatus according to aspects of the present disclosure. The example shown includes processor unit 300, memory unit 305, training component 310, and event argument extraction network 315. In one embodiment, event argument extraction network 315 includes document encoder 320, structure component 325, relationship encoder 330, and decoder 335.

A processor unit 300 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 300 is configured to operate a memory array using a memory controller. In other cases, a memory controller is integrated into the processor. In some cases, the processor unit 300 is configured to execute computer-readable instructions stored in a memory to perform various functions. In some embodiments, a processor unit 300 includes special purpose components for modem processing, baseband processing, digital signal processing, or transmission processing.

Examples of a memory unit 305 include random access memory (RAM), read-only memory (ROM), or a hard disk. Examples of memory unit 305 include solid state memory and a hard disk drive. In some examples, a memory unit 305 is used to store computer-readable, computer-executable software including instructions that, when executed, cause a processor to perform various functions described herein. In some cases, the memory unit 305 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 305 store information in the form of a logical state.

According to some embodiments of the present disclosure, the event argument extraction apparatus includes a computer implemented artificial neural network (ANN) that predicts a relationship between an event trigger word and an argument candidate word based on a relationship representation vector. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, training component 310 receives training data including documents including a set of words organized into a set of sentences, the words including an event trigger word and argument words, and the training data further including ground truth relationships between the event trigger word and the argument words. In some examples, training component 310 computes a loss function by comparing the predicted relationships to the ground truth relationships. In some examples, training component 310 updates parameters of a neural network based on the loss function. In some examples, the updated parameters include parameters of a position embedding table used for generating the word representation vectors. In some examples, the updated parameters include parameters of weight matrices used for generating the semantic structure. In some examples, the updated parameters include weights for weighted linear combinations of the document structures used for generating the relationship representation vectors.

According to some embodiments, event argument extraction network 315 receives a document including a set of words organized into a set of sentences, the words including an event trigger word and an argument candidate word.

According to some embodiments, document encoder 320 generates word representation vectors for the words. In some examples, document encoder 320 encodes the words of the document to produce individual word embeddings. The document encoder 320 then identifies relative position of word pairs of the document to produce position embeddings, where the word representation vectors are based on the word embeddings and the position embeddings. In some examples, document encoder 320 applies a long short-term memory (LSTM) to produce word embeddings and position embeddings. The document encoder 320 then extracts a hidden vector from the LSTM to produce the word representation vectors.

According to some embodiments, document encoder 320 is configured to generate word representation vectors for words of a document organized into a plurality of sentences, the words comprising an event trigger word and an argument candidate word. In some examples, the document encoder 320 includes a word encoder, a position embedding table, and an LSTM. Document encoder 320 is an example of, or includes aspects of, the corresponding element described with reference to FIG. 4.

According to some embodiments, structure component 325 generates a set of document structures including a semantic structure for the document based on the word representation vectors, a syntax structure representing dependency relationships between the words, and a discourse structure representing discourse information of the document based on the set of sentences. In some examples, structure component 325 receives dependency tree information for the sentences of the document. The structure component 325 then connects the dependency tree information for the sentences to create a combined dependency tree. The structure component 325 then identifies a path between a pair of words of the combined dependency tree, where the syntax structure is generated based on the path.

In some examples, structure component 325 applies a weighted matrix to each word representation vector of a pair of the word representation vectors to produce weighted word representation vectors. Next, the structure component 325 computes a semantic similarity score for the pair of the word representation vectors based on the weighted word representation vectors, where the semantic structure is based on the semantic similarity score.

In some examples, structure component 325 maps the words to corresponding nodes of a lexical database. Next, the structure component 325 identifies a glossary for each of the corresponding nodes. The structure component 325 then identifies node embeddings based on the glossary. The structure component 325 then computes a glossary similarity score for a pair of the node embeddings, where the semantic structure is based on the glossary similarity score.

In some examples, structure component 325 maps the words to corresponding nodes of a lexical database. Next, the structure component 325 computes information content of the corresponding nodes, and a least common subsumer for a pair of the corresponding nodes. The structure component 325 then computes a structural similarity score for the pair of the corresponding nodes, where the semantic structure is based on the structural similarity score. In some examples, structure component 325 computes a boundary score for a pair of words based on whether the pair of words are both located in a same sentence, where the discourse structure is based on the boundary score.

In some examples, structure component 325 identifies coreference information for words of the document. Then, the structure component 325 computes a coreference score for a pair of words based on whether the pair of words are located in sentences containing entity mentions that refer to a same entity of the coreference information, where the discourse structure is based on the coreference score. In some examples, the structure component 325 includes a lexical database, a dependency parser, and a coreference network. Structure component 325 is an example of, or includes aspects of, the corresponding element described with reference to FIG. 4.

One or more embodiments of the present disclosure combine different information sources to generate effective document structures for event argument extraction tasks. The event argument extraction network 315 produces document structures based on knowledge from syntax (i.e., dependency trees), discourse (i.e., coreference links), and semantic similarity. Semantic similarity depends on contextualized representation vectors to compute interaction scores between nodes and relies on using external knowledge bases to enrich document structures for event argument extraction. The words in the documents are linked to the entries in one or more external knowledge bases and exploit the entry similarity in knowledge bases to obtain word similarity scores for the structures. In some examples, lexical database (e.g., WordNet) is used as the knowledge base and tools (e.g., word sense disambiguation or WSD) are applied to facilitate word-entry linking. The linked entry or node in WordNet can provide expert knowledge on the meanings of the words (e.g., glossary and hierarchy information). Such expert knowledge complements the contextual information of words and enhances the semantic-based document structures for event argument extraction. In some embodiments, the event argument extraction network 315 uses one or more external knowledge bases for document structures in information extraction tasks.

A knowledge base refers to structured information, which may be extracted from a vast amount of unstructured or unusable data. A knowledge base may be used for downstream applications for search, question-answering, link prediction, visualization, modeling, and etc.

Knowledge base construction is challenging as it involves dealing with complex input data and tasks such as parsing, extracting, cleaning, linking, and integration. Using machine learning techniques, these tasks typically depend on feature engineering (i.e., manually crafting attributes of the input data to feed into a system). In some cases, deep learning models can operate directly over raw input data such as text or images, and enable connections between a set of entities, and a user can interpret those connections after a knowledge accumulation phase and make inferences based on prior knowledge.

According to some embodiments, relationship encoder 330 generates a relationship representation vector based on the document structures. In some examples, relationship encoder 330 generates a set of intermediate structures for each of a set of channels of a graph transformer network (GTN), where each of the intermediate structures includes a weighted linear combination of the document structures. The relationship encoder 330 then generates a hidden vector for each of the channels using a graph convolution network (GCN), where the relationship representation vector is generated based on the hidden vector for each of the channels. In some examples, the relationship encoder 330 includes a GTN and a GCN. Relationship encoder 330 is an example of, or includes aspects of, the corresponding element described with reference to FIG. 4.

A Graph Transformer Network (GTN) is capable of generating new graph structures, which involve identifying useful connections between unconnected nodes on the original graph, while learning effective node representation on the new graphs in an end-to-end fashion. Graph Transformer layer, a core layer of the GTN, learns a soft selection of edge types and composite relations for generating useful multi-hop connections or meta-paths. In some cases, GTNs learn new graph structures, based on data and tasks without domain knowledge, and can yield powerful node representation via convolution on the new graphs. Without domain-specific graph preprocessing, GTNs outperform existing technology that require pre-defined meta-paths from domain knowledge.

According to some embodiments, decoder 335 predicts a relationship between the event trigger word and the argument candidate word based on the relationship representation vector. In some examples, decoder 335 applies a feed-forward neural network to the relationship representation vector. In some examples, decoder 335 applies a softmax layer to an output of the feed-forward neural network, where the relationship is predicted based on the output of the softmax layer. In some examples, the decoder 335 includes a feed-forward layer and a softmax layer. Decoder 335 is an example of, or includes aspects of, the corresponding element described with reference to FIG. 4.

A softmax function is used as the activation function of the neural network to normalize the output of the network to a probability distribution over predicted output classes. After applying the softmax function, each component of the feature map is in the interval (0, 1) and the components add up to one. These values are interpreted as probabilities.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 4 shows an example of an event argument extraction network according to aspects of the present disclosure. The example shown includes document 400, document encoder 405, word representation vectors 410, structure component 415, document structures 420, relationship encoder 440, relationship representation vector 445, decoder 450, and relationship 455.

One or more embodiments of the present disclosure relate to tasks of identifying roles of entity mention or arguments in the events evoked by trigger words. An event argument extraction network includes a deep learning model for document-level event argument extraction tasks where document structures and graphs are utilized to represent input documents and support representation learning. The document structures are used in the event argument extraction network to facilitate direct connections and interactions of important context words, which may be located far from each other in the documents. Additionally, these document structures enhance representation vectors (e.g., for event argument extraction tasks). Multiple sources of information (e.g., syntax structure, semantic structure, and discourse structure) are leveraged and combined to generate document structures for a document-level EAE network model (i.e., the event argument extraction network). Furthermore, the network model incorporates external knowledge for words in these documents (retrieved from a lexical database such as WordNet) to compute document structures and use of graph-based networks (e.g., a graph transformer network or GTN) to induce relatively rich document structures for event argument extraction tasks. The network model leads to increased performance of document-level tasks (e.g., event argument extraction).

From top to bottom as illustrated in FIG. 4, a document 400 is input to a document decoder 405. Document encoder 405 is an example of, or includes aspects of, the corresponding element described with reference to FIG. 3. The event argument extraction network is configured to identify entity mentions involved in events (event participants and spatio-temporal attributes, collectively known as event arguments) based on the document 400. In some embodiments, the event argument extraction network takes an event trigger word of the document 400 as input and an argument candidate (entity mention) to predict the role of an argument candidate in the event mention associated with the event trigger word. The document encoder 405 then produces word representation vectors 410 based on the document 400.

The event argument extraction network is not limited to sentence-level event argument extraction where event triggers and arguments appear in the same sentence. In some cases, arguments of an event may be presented in sentences other than a sentence that hosts event triggers in an document 400. For example, in the EE dataset of the DARPA AIDA program (phase 1) extraction, 38% of arguments are shown outside the sentences containing the corresponding triggers, i.e., in the document-level context.

In some examples, document-level event argument extraction involves long document context, so that the network model is configured to identify important context words (among long word sequences) effectively and link them to event triggers and arguments for role prediction.

The word representation vectors 410 are input to a structure component 415 to produce document structures 420. Structure component 415 is an example of, or includes aspects of, the corresponding element described with reference to FIG. 3. In one embodiment, document structures 420 includes semantic structure 425, syntax structure 430, and discourse structure 435.

Document structures 420 are used to facilitate connection and reasoning between important context words for prediction. In some cases, document structures 420 may refer to interaction graphs, utilizing designated objects in one or more documents (e.g., words, entity mentions, sentences) to form nodes, and different information sources and heuristics to establish the edges. For example, document structures 420 may be represented using adjacency matrices for which the value or score at one cell indicates the importance of a node toward the other one for representation learning and role prediction in event argument extraction. Such direct connections between nodes enable objects, which are sequentially far from each other in the documents, to interact and produce useful information. Document structures 420 and graphs are used to perform document context modeling and representation learning for document-level event argument extraction.

Existing models use specific types of information or heuristics (e.g., use only one type of information) to form the edges in document structures. However, the event argument extraction network can leverage a diversity of useful information to enrich document structures 420 in event argument extraction. In an embodiment, the structure component 415 can generate document structures 420 based on syntactic dependency trees of a set of sentences, considering discourse structures (e.g., coreference links) to induce document structures 420, and employing semantic representation-based similarity between tokens to infer document structures 420. The network model considers multiple information sources to capture important interaction information between nodes or words.

The event argument extraction network is configured to produce combination of document structures 420 for event argument extraction where the argument reasoning process for the event trigger word and the argument candidate word involves a sequence of interactions with multiple other words, using different types of information at each interaction step, e.g., syntax, discourse and/or semantic information (i.e., heterogeneous interaction types). The interaction score for a pair of nodes or words (i,j) in the combined structures for event argument extraction are conditioned on the two involved words (i.e., i and j) and conditioned on sequences of other words to enable heterogeneous interaction types between the pairs of words in the sequence.

One or more embodiments of the present disclosure provide graph-based networks (e.g., GTN and GCN) for document structure combination and representation learning in document-level event argument extraction. In an embodiment, the network model uses a graph-based network that learns graphical transformation of input (e.g., GTN) to implement a multi-hop heterogeneous reasoning architecture. The weighted sums of initial document structures, serving as intermediate structures that capture information are obtained from different perspectives (heterogeneous types). Next, the intermediate structures are multiplied to generate the final combined document structures that enable involvement of multiple other words into a single structure score (multi-hop reasoning paths).

Next, the document structures 420 are input to the relationship encoder 440 to produce relationship representation vector 445. The relationship encoder 440 is an example of, or includes aspects of, the corresponding element described with reference to FIG. 3. The resulting combined structures are used to learn representation vectors for event argument extraction based on graph convolutional networks (GCNs), which are convolutional neural networks used to encode graphs.

The relationship representation vector 445 is then input to the decoder 450 to produce relationship 455 between the event trigger word and the argument candidate word. Decoder 450 is an example of, or includes aspects of, the corresponding element described with reference to FIG. 3.

Event Argument Extraction

Figure 5:
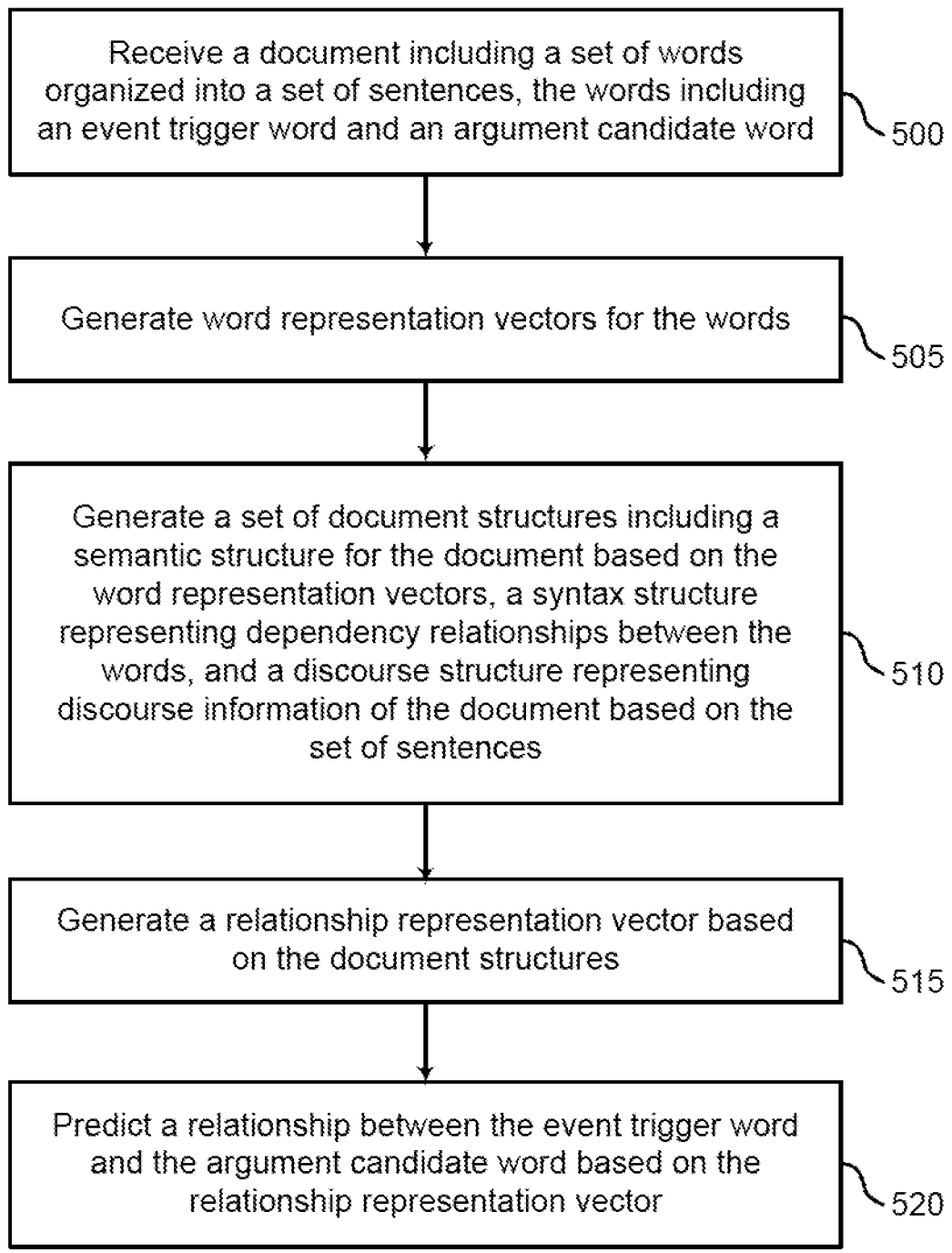
FIG. 5 shows an example of a process for natural language processing according to aspects of the present disclosure.

In accordance with FIG. 5, a method, apparatus, and non-transitory computer readable medium for natural language processing are described. One or more embodiments of the method, apparatus, and non-transitory computer readable medium include receiving a document comprising a plurality of words organized into a plurality of sentences, the words comprising an event trigger word and an argument candidate word, generating word representation vectors for the words, generating a plurality of document structures including a semantic structure for the document based on the word representation vectors, a syntax structure representing dependency relationships between the words, and a discourse structure representing discourse information of the document based on the plurality of sentences, generating a relationship representation vector based on the document structures, and predicting a relationship between the event trigger word and the argument candidate word based on the relationship representation vector.

FIG. 5 shows an example of a process for natural language processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 500, the system receives a document including a set of words organized into a set of sentences, the words including an event trigger word and an argument candidate word. In some cases, the operations of this step refer to, or may be performed by, an event argument extraction network as described with reference to FIG. 3. In some examples, the event trigger word is located in a different sentence (or even a different document) than the position of the argument candidate word.

One or more embodiments of the present disclosure formulates document-level event argument extraction as a multi-class classification task. The input to the system is a document $D=w_1, w_2, \ldots, w_N$ comprising multiple sentences, i.e., $S_i$'s. The event argument extraction network includes a golden event trigger, i.e., the t-th word of the $D(w_t)$, and an argument candidate, i.e., the a-th word of D ($w_a$), as the inputs ($w_t$ and $w_a$ can occur in different sentences). In some embodiments, the system is configured to predict the role of an argument candidate $w_a$ in an event mention evoked by $w_t$. In some cases, the role may be None, indicating that $w_a$ is not a participant in the event mention $w_t$. Additionally, the event argument extraction network includes a document encoder to transform the words in D into high dimensional vectors, a structure generation component (e.g., a structure component) to generate initial document structures for event argument extraction, and a structure combination component (e.g., a relationship encoder) to combine these document structures and learn representation vectors for role prediction.

At operation 505, the system generates word representation vectors for the words. In some cases, the operations of this step refer to, or may be performed by, a document encoder as described with reference to FIGS. 3 and 4.

Some examples of the method, apparatus, and non-transitory computer readable medium described above further include encoding the words of the document to produce individual word embeddings. Some examples further include identifying relative position of word pairs of the document to produce position embeddings, wherein the word representation vectors are based on the word embeddings and the position embeddings.

Some examples of the method, apparatus, and non-transitory computer readable medium described above further include applying a long short-term memory (LSTM) to produce word embeddings and position embeddings. Some examples further include extracting a hidden vector from the LSTM to produce the word representation vectors.

In an embodiment, each word $w_i \in D$ is transformed into a representation vector $x_i$ that is the concatenation of two vectors, a pre-trained word embedding of $w_i$ and position embeddings of $w_i$. For the pre-trained word embedding of $w_i$, the network model considers both non-contextualized (i.e., GloVe) and contextualized embeddings (i.e., BERT) embeddings. For example, in the BERT model, as $w_i$ may be split into multiple word-pieces, the average of the hidden vectors is used for the word-pieces of $w_i$ in the last layer of the BERT model as the word embedding vector for $w_i$. In an embodiment, the $BERT_{base}$ variation model is used where D is divided into segments of 512 word-pieces to be encoded separately.

For the position embeddings of $w_i$, these vectors are obtained by calculating the relative distances between $w_i$ and the trigger and argument words (i.e., i–t and i–a respectively) from a position embedding table. The table is initialized randomly and updated in the training process. Position embedding vectors are important as the network model depends on the position embedding vectors regarding the positions of the trigger and argument words.

The vectors $X=x_1, x_2, \ldots, x_n$ represent the words D, and these vectors are input to a bi-directional long short-term memory network (LSTM) to generate an abstract vector sequence $H=h_1, h_2, \ldots, h_N$. $h_i$ is the hidden vector for $w_i$ that is obtained by concatenating the corresponding forward and backward hidden vectors from the bi-directional LSTM. In some cases, the hidden vectors in H are used as inputs for the subsequent computation. At the instant step, the sentence boundary information of D are not included yet in the hidden vectors H. The sentence boundary information of D will be described in greater detail below.

At operation 510, the system generates a set of document structures including a semantic structure for the document based on the word representation vectors, a syntax structure representing dependency relationships between the words, and a discourse structure representing discourse information of the document based on the set of sentences. In some cases, the operations of this step refer to, or may be performed by, a structure component as described with reference to FIGS. 3 and 4.

Some examples of the method, apparatus, and non-transitory computer readable medium described above further include receiving dependency tree information for the sentences of the document. Some examples further include connecting the dependency tree information for the sentences to create a combined dependency tree. Some examples further include identifying a path between a pair of words of the combined dependency tree, wherein the syntax structure is generated based on the path.

Some examples of the method, apparatus, and non-transitory computer readable medium described above further include applying a weighted matrix to each word representation vector of a pair of the word representation vectors to produce weighted word representation vectors. Some examples further include computing a semantic similarity score for the pair of the word representation vectors based on the weighted word representation vectors, wherein the semantic structure is based on the semantic similarity score.

Some examples of the method, apparatus, and non-transitory computer readable medium described above further include mapping the words to corresponding nodes of a lexical database. Some examples further include identifying a glossary for each of the corresponding nodes. Some examples further include identifying node embeddings based on the glossary. Some examples further include computing a glossary similarity score for a pair of the node embeddings, wherein the semantic structure is based on the glossary similarity score.

Some examples of the method, apparatus, and non-transitory computer readable medium described above further include mapping the words to corresponding nodes of a lexical database. Some examples further include computing information content of the corresponding nodes, and a least common subsumer for a pair of the corresponding nodes. Some examples further include computing a structural similarity score for the pair of the corresponding nodes, wherein the semantic structure is based on the structural similarity score.

Some examples of the method, apparatus, and non-transitory computer readable medium described above further include computing a boundary score for a pair of words based on whether the pair of words are both located in a same sentence, wherein the discourse structure is based on the boundary score.

Some examples of the method, apparatus, and non-transitory computer readable medium described above further include identifying coreference information for words of the document. Some examples further include computing a coreference score for a pair of words based on whether the pair of words are located in sentences containing entity mentions that refer to a same entity of the coreference information, wherein the discourse structure is based on the coreference score.

The event argument extraction network generates initial document structures that would be subsequently combined to learn representation vectors for document-level event argument extraction. In some embodiments, a document structure involves an interaction graph $\mathcal{G}=\{\mathcal{N}, \varepsilon\}$ between the words in D, i.e., $\mathcal{N}=\{w_i|w_i \in D\}$. The document structure $\mathcal{G}$ is represented using a real-valued adjacency matrix $A=\{a_{ij}\}_{i,j=1 \ldots N}$, where the value or score $a_{ij}$ reflects the importance (or the level of interaction) of $w_j$ for the representation computation of $w_i$ for event argument extraction. Accordingly, $w_i$ and $w_j$ can influence representation computation of each other even if these words are sequentially far away from each other in D, resulting in flexible flow of information in representation learning for event argument extraction. Various types of information are simultaneously considered to form the edges $\varepsilon$ (or compute the interaction scores $a_{ij}$), including syntax structure, semantic structure, and discourse structure.

In some examples, the syntax-based document structure is based on sentence-level event argument extraction where dependency parsing trees of input sentences reveal important context, i.e., via the shortest dependency paths to connect event triggers and arguments, and guide the interaction modeling between words for argument role prediction by LSTM cells. The dependency trees for the sentences in D are used to provide information for the document structures for event argument extraction.

In some embodiments, the dependency relations or connections between pairs of words in W are leveraged to compute interaction scores $a_{ij}^{dep}$ in the syntax-based document structure $A^{dep}=\{a_{ij}^{dep}\}_{i,j=1 \ldots N}$ for D. Two words are more important to each other for representation learning if these two words are connected in the dependency trees. In an embodiment, the dependency tree $T_i$ for each sentence $S_i$ in D is obtained using a dependency parser. For example, Stanford Core NLP Toolkit is used to parse the sentences. Then, the dependency trees $T_i$ are connected for the sentences, and the event argument extraction network creates a link between root node of a tree $T_i$ for $S_i$ with the root node of the tree $T_{i+1}$ for the subsequent sentence $S_{i+1}$. The network model then retrieves the shortest path $P^D$ between the nodes for $w_t$ and $w_a$ in $T^D$. Next, the network model computes an interaction score $a_{ij}^{dep}$. The interaction score $a_{ij}^{dep}$ is set to 1 if $(w_i, w_j)$ or $(w_j, w_i)$ is an edge in P, and 0 otherwise. Accordingly, the document structure $A^{dep}$ is set to focus on the syntax-based important context words and their dependency interaction for the role prediction between $w_t$ and $w_a$.

In an embodiment, the system is configured to generate a semantic (document) structure. The semantic-based document structures evaluate the above interaction scores in the structures based on semantic similarity of words (i.e., two words are more important for representation learning of each other if they are more semantically related). The event argument extraction network applies two complementary approaches to capture the semantics of the words in D for semantic-based structure generation, i.e., contextual semantics and knowledge-based semantics.

In an embodiment, contextual semantics reveal the semantic of a word via the context in which it appears. This suggests the use of contextualized representation vectors $h_i \in H$ (obtained from the LSTM model) to capture contextual semantics for the words $w_i \in D$ and produce a contextual semantic-based document structure $A^{context} = \{a_{ij}^{context}\}_{i,j=1 \ldots N}$ for D. The network model computes semantic-based interaction score $a_{ij}^{dep.for\ w}{}_i$ and $w_j$ through employing the normalized similarity score between their contextualized representation vectors:

$$k_i = U_k h_i,\ q_i = U_q h_i \quad (1)$$

$$a_{ij}^{context} = \exp(k_i q_j) / \sum_{v=1..N} \exp(k_i q_v) \quad (2)$$

where $U_k$ and $U_q$ are trainable weight matrices, and biases are omitted herein for brevity and convenience of description.

In an embodiment, knowledge-based semantics employ external knowledge of the words from one or more knowledge bases to capture their semantics. The external knowledge provides a complementary source of information for the contextual semantics of the words (i.e., external knowledge versus internal contexts) to enrich the document structures for D. In some examples, a knowledge base for word meanings such as WordNet is used to obtain external knowledge for the words in D. WordNet involves a network connecting word meanings (i.e., synsets) according to various semantic relations (e.g., synonyms, hyponyms). Each node/synset in WordNet is associated with a textual glossary to provide expert definitions of the corresponding meaning.

In an embodiment, the knowledge-based document structures generated for D can map each word $w_i \in D$ to a synset node $M_i$ in WordNet with a Word Sense Disambiguation (WSD) tool. One embodiment of the present disclosure uses a knowledge base (e.g., WordNet 3.0) and a BERT-based WSD tool to perform word synset mapping. Then, the knowledge based interaction scores between two words $w_i$ and $w_j$ in D are determined by leveraging the similarity scores between two linked synset nodes $M_i$ and $M_j$ in WordNet. The information embedded in synset nodes $M_i$ is leveraged by using two versions of knowledge-based document structures for D based on glossaries of the synset nodes and hierarchy structures in the knowledge base (e.g., WordNet).

The glossary-based document structure is represented as follows:

$$A^{gloss} = \{a_{ij}^{gloss}\}_{i,j=1 \ldots N} \quad (3)$$

For each word $w_i \in D$, the network model retrieves glossary $GM_i$ (a sequence of words) from the corresponding linked node $M_i$ in WordNet. A representation vector $VM_i$ is computed to capture the semantic information in $GM_i$, by applying the max-pooling operation over non-contextualized (i.e., GloVe-based) pre-trained embeddings of the words in $GM_i$. The glossary-based interaction score $a_{ij}^{gloss}$ for $w_i$ and $w_j$ is estimated using the similarity between the glossary representations $VM_i$ and $VM_j$ (with the cosine similarity) as $a_{ij}^{gloss} = \text{cosine}(VM_i, VM_j)$.

A knowledge base (e.g., WordNet) hierarchy-based document structure is given as $A^{struct} = \{a_{ij}^{struct}\}_{i,j=1 \ldots N}$. The interaction score $a_{ij}^{struct}$ for $w_i$ and $w_j$ relies on the structure-based similarity of the linked synset nodes $M_i$ and $M_j$ in a knowledge base (e.g., WordNet). A relevant similarity measure (e.g., Lin similarity) is applied to the synset nodes in WordNet as follows:

$$a_{ij}^{struct} = \frac{2 * IC(LCS(M_i, M_j))}{IC(M_i) + IC(M_j)} \quad (4)$$

where IC and LCS represent the information content of the synset nodes and the least common subsumer of the two synsets in the WordNet hierarchy (most specific ancestor node), respectively. In some examples, an NLTK (Natural Language Toolkit) tool is used to obtain the Lin similarity. Other WordNet-based similarities may also be considered.

In some cases, lengths of input texts are different between document-level event argument extraction and sentence-level event argument extraction. One difference between document-level and sentence-level event argument extraction involves the presence of multiple sentences in document-level event argument extraction where discourse information (i.e., where the sentences span and how the sentences relate to each other) is used to understand the input documents. The present disclosure leverages discourse structures to provide complementary information for the syntax-based and semantic-based document structures for event argument extraction. The sentence boundary-based and coreference-based discourse information is used to generate discourse-based document structures for event argument extraction.

In an embodiment, the structure component of the network model is configured to generate a sentence boundary-based document structure as follows:

$$A^{sent} = \{a_{ij}^{sent}\}_{i,j=1 \ldots N} \quad (5)$$

$A^{sent}$ relates to the same sentence information of the words in D. The two words in a same sentence involve more useful information for the representation computation of each other than those words in different sentences. The event argument extraction computes $A^{sent}$ by setting the sentence boundary-based score $a_{ij}^{sent}$ to 1 if $w_i$ and $w_j$ appear in the same sentence in D and 0 otherwise.

In an embodiment, the structure component of the network model is configured to generate a coreference-based document structure as follows:

$$A^{coref} = \{a_{ij}^{coref}\}_{i,j=1 \ldots N} \quad (6)$$

The event argument extraction network uses the relations and connections between the sentences (cross-sentence information) in D rather than considering within-sentence information. Two sentences in D are considered to be related if they contain entity mentions that refer to the same entity in D (coreference information). For example, Stanford NLP Toolkit is used to determine the coreference of entity mentions. Based on such a relation between sentences, two words in D are considered more relevant to each other if they appear in related sentences. Therefore, for the coreference-based structure, $a_{ij}^{coref}$ is set to 1 if $w_i$ and $w_j$ appear in different, but related sentences, and 0 otherwise.

At operation 515, the system generates a relationship representation vector based on the document structures. In some cases, the operations of this step refer to, or may be performed by, a relationship encoder as described with reference to FIGS. 3 and 4.

Some examples of the method, apparatus, and non-transitory computer readable medium described above further include generating a plurality of intermediate structures for each of a plurality of channels of a graph transformer network (GTN), wherein each of the intermediate structures comprises a weighted linear combination of the document structures. Some examples further include generating a hidden vector for each of the channels using a graph convolution network (GCN), wherein the relationship representation vector is generated based on the hidden vector for each of the channels.

In some embodiments, six different document structures are generated for D (i.e., $\mathcal{A} = [A^{dep}, A^{context}, A^{gloss}, A^{struct}, A^{sent}, A^{coref}]$) as described above. The document structures are based on complementary types of information (i.e., structure types), the system then combines them to generate richer document structures for event argument extraction. The combination is achieved noting each importance score $a_{ij}^v$ in one of the structures $A_{ij}^v$ ($v \in V=\{\text{dep, context, gloss, struct, sent, coref}\}$) which considers the direct interaction between the two involving words $w_i$ and $w_j$ (i.e., not including any other words) according to one specific information type v. Each importance score in the combined structures is conditioned on the interactions with other important context words in D (i.e., in addition to the two involving words) where each interaction between a pair of words can use any of the six structure types (multi-hop and heterogeneous-type reasoning). Therefore, graph-based networks (e.g., GTN) are used to enable a multi-hop and heterogeneous-type reasoning in the structure combination for event argument extraction.

In some examples, multi-hop reasoning paths may be implemented at different lengths through adding the identity matrix I (e.g., 428 size N×N) into the set of initial document structures $\mathcal{A} = [A^{dep}, A^{context}, A^{gloss}, A^{struct}, A^{sent}, A^{coref}, I] = [\mathcal{A}_1, \ldots, \mathcal{A}_7]$. The graph-based network model (e.g., GTN) is organized into C channels for structure combination (motivated by multi-head attention in transformers), where the k-th channel contains M intermediate document structures $Q_1^k, Q_2^k, \ldots, Q_M^k$ of size N×N. As such, each intermediate structure $Q_i^k$ is computed by a linear combination of the initial structures $\mathcal{A}$ using learnable weights $\alpha_{ij}^k$ as follows:

$$Q_i^k = \Sigma_{j=1 \ldots 7} \alpha_{ij}^k \mathcal{A}_j \quad (7)$$

Due to the linear combination, the interaction scores in $Q_i^k$ are able to reason with any of the six initial structure types in V (although such scores consider the direct interactions of the involving words). The intermediate structures $Q_1^k, Q_2^k, \ldots, Q_M^k$ in each channel k are multiplied to generate the final document structure $Q^k = Q_1^k \times Q_2^k \times \ldots \times Q_M^k$ of size N×N (for the k-the channel). Matrix multiplication enables the importance score between a pair of words $w_i$ and $w_j$ in $Q^k$ conditioning on the multi-hop interactions or reasoning between the two words and other words in D (up to M−1 hops due to the inclusion of I in $\mathcal{A}$). The interactions involved in one importance score in $Q^k$ may be based on any of the initial structure types in V (heterogeneous reasoning) due to the flexibility of the intermediate structure $Q_i^k$.

The GTN model feeds the rich document structures $Q^1, Q^2, \ldots, Q^C$ from the C channels into C graph convolutional networks (GCNs) to induce document structure-enriched representation vectors for argument role prediction in event argument extraction (one GCN for each $Q^k = \{Q_{ij}^k\}_{i,j=1 \ldots N}$). As such, each of these GCN models involves G layers that produce the hidden vectors $\overline{h}_1^{k,t}, \ldots, \overline{h}_N^{k,t}$ at the t-th layer of the k-th GCN model for the words in D ($1 \leq k \leq C$, $1 \leq t \leq G$) using:

$$\overline{h}_i^{k,t} = ReLU\left(U^{k,t} \sum_{j=1,N} \frac{Q_{ij}^k \overline{h}_j^{k,t-1}}{\Sigma_{u=1,N} Q_{iu}^k}\right) \quad (8)$$

where $U^{k,t}$ is the weight matrix for the t-th layer of the k-th GCN model and the input vectors $\overline{h}_i^{k,0}$ for the GCN models are obtained from the contextualized representation vectors H (i.e., $\overline{h}_i^{k,0} = h_i$ for all $1 \leq k \leq C$, $1 \leq i \leq N$).

In a neural network, an activation function may be used to transforming summed weighted inputs from a node into the activation of the node or an output. A ReLU layer may implement a rectified linear activation function, which comprises a piecewise linear function that outputs the input directly if is positive, otherwise, it outputs zero. A rectified linear activation function may be used as a default activation function for many types of neural networks. Using a rectified linear activation function may enable the use of stochastic gradient descent with backpropagation of errors to train deep neural networks. The rectified linear activation function may operate similar to a linear function, but it may enable complex relationships in the data to be learned. The rectified linear activation function may also provide more sensitivity to the activation sum input to avoid saturation. A node or unit that implements a rectified linear activation function may be referred to as a rectified linear activation unit, or ReLU for short. Networks that use a rectifier function for hidden layers may be referred to as rectified networks.

Next, the hidden vectors in the last layers of all the GCN models (at the G-th layers) for $w_i$ (i.e., $\overline{h}_i^{1,G}, \overline{h}_i^{2,G}, \ldots, \overline{h}_i^{C,G}$) are concatenated to form the final representation vector $h'_i$ for $w_i$ in the GTN model as $h'_i = [\overline{h}_i^{1,G}, \overline{h}_i^{2,G}, \ldots, \overline{h}_i^{C,G}]$.

The event argument extraction network assembles a representation vector R based on the hidden vectors for $w_a$ and $w_t$ from the GTN model as follows:

$$R = [h'_a, h'_t, \text{MaxPool}(h'_1, h'_2, \ldots, h'_N)] \quad (9)$$

At operation 520, the system predicts a relationship between the event trigger word and the argument candidate word based on the relationship representation vector. In some cases, the operations of this step refer to, or may be performed by, a decoder as described with reference to FIGS. 3 and 4.

Some examples of the method, apparatus, and non-transitory computer readable medium described above further include applying a feed-forward neural network to the relationship representation vector. Some examples further include applying a softmax layer to an output of the feed-forward neural network, wherein the relationship is predicted based on the output of the softmax layer.

In an embodiment, the representation vector R is used to predict the argument role for $w_a$ and $w_t$ in D. The representation vector R is then input to a two-layer feed-forward network with softmax to produce a probability distribution P(.|D, a, t) over the possible argument roles.

Training and Evaluation

Figure 6:
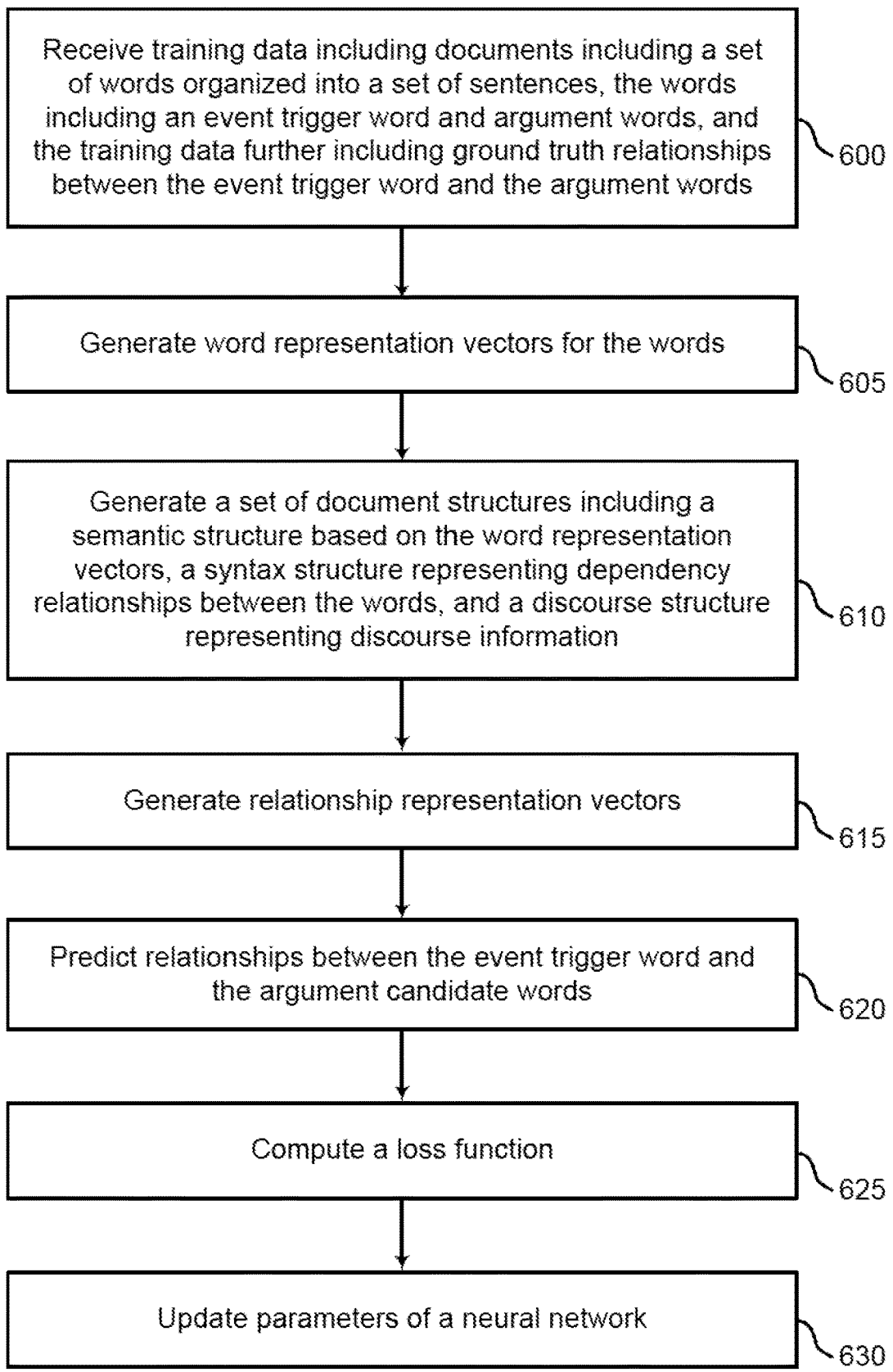
FIG. 6 shows an example of a process for training an event argument extraction network according to aspects of the present disclosure.

In accordance with FIG. 6, a method, apparatus, and non-transitory computer readable medium for training a neural network are described. One or more embodiments of the method, apparatus, and non-transitory computer readable medium include receiving training data including documents comprising a plurality of words organized into a plurality of sentences, the words comprising an event trigger word and argument words, and the training data further including ground truth relationships between the event trigger word and the argument words, generating word representation vectors for the words, generating a plurality of document structures including a semantic structure based on the word representation vectors, a syntax structure representing dependency relationships between the words, and a discourse structure representing discourse information based on the plurality of sentences, generating relationship representation vectors based on the document structures, predicting relationships between the event trigger word and the argument candidate words based on the relationship representation vectors, computing a loss function by comparing the predicted relationships to the ground truth relationships, and updating parameters of a neural network based on the loss function.

In some examples, the updated parameters comprise parameters of a position embedding table used for generating the word representation vectors. In some examples, the updated parameters comprise parameters of weight matrices used for generating the semantic structure. In some examples, the updated parameters comprise weights for weighted linear combinations of the document structures used for generating the relationship representation vectors.

FIG. 6 shows an example of a process for training an event argument extraction network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

One or more embodiments of the present disclosure use supervised training techniques. Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

Accordingly, during the training process, the parameters and weights of an event argument extraction network are adjusted to increase the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

At operation 600, the system receives training data including documents including a set of words organized into a set of sentences, the words including an event trigger word and argument words, and the training data further including ground truth relationships between the event trigger word and the argument words. In some cases, the operations of this step refer to, or may be performed by, a training component as described with reference to FIG. 3.

At operation 605, the system generates word representation vectors for the words. In some cases, the operations of this step refer to, or may be performed by, a document encoder as described with reference to FIGS. 3 and 4.

In some embodiments, document-level event argument extraction is formulated as a multi-class classification task. The input to an event argument extraction network of the system is a document comprising multiple sentences. The document includes an event trigger word, e.g., the t-th word of the document and an argument candidate word.

In an embodiment, the event argument extraction network is trained to predict the role of an argument candidate word in an event mention evoked by an event trigger word. In some cases, the role may be None, indicating that the argument candidate word is not a participant in the event mention. The network model includes a document encoder to transform the words in the document into high-dimensional vectors. In some cases, the argument candidate word is not limited to a word but can be a phrase or a sentence from a document.

At operation 610, the system generates a set of document structures including a semantic structure based on the word representation vectors, a syntax structure representing dependency relationships between the words, and a discourse structure representing discourse information based on the set of sentences. In some cases, the operations of this step refer to, or may be performed by, a structure component as described with reference to FIGS. 3 and 4.

In some embodiments, the system uses document structures for document-level event argument extraction and relates to multiple document structures such as relation extraction, question answering and generation, text summarization, and document classification. Additionally, the system uses external knowledge to generate the structures (e.g., based on WordNet) and combines multiple structures for multi-hop heterogeneous reasoning using a GTN. The system combines multiple document structures to learn representation vectors for document-level event argument extraction.

At operation 615, the system generates relationship representation vectors based on the document structures. In some cases, the operations of this step refer to, or may be performed by, a relationship encoder as described with reference to FIGS. 3 and 4. A relationship encoder is trained to combine these document structures mentioned above and learn representation vectors for role prediction.

In some embodiments, six different document structures are generated for the documents. The document structures are based on complementary types of information (i.e., structure types), the system then combines them to generate rich document structures for event argument extraction. The combination is achieved noting each importance score $a_{ij}^v$ in one of the structures $A_{ij}^v$ ($v \in V=\{$dep, context, gloss, struct, sent, coref$\}$) which considers the direct interaction between the two involving words $w_i$ and $w_j$ (i.e., not including any other words) according to one specific information type v. Each importance score in the combined structures is conditioned on the interactions with other important context words in a document (i.e., in addition to the two involving words) where each interaction between a pair of words can use any of the six structure types (multi-hop and heterogeneous-type reasoning). Therefore, graph-based networks (e.g., GTN) are used to enable a multi-hop and heterogeneous-type reasoning in the structure combination for event argument extraction.

At operation 620, the system predicts relationships between the event trigger word and the argument candidate words based on the relationship representation vectors. In some cases, the operations of this step refer to, or may be performed by, a decoder as described with reference to FIGS. 3 and 4.

At operation 625, the system computes a loss function by comparing the predicted relationships to the ground truth relationships. In some cases, the operations of this step refer to, or may be performed by, a training component as described with reference to FIG. 3.

In some examples, a supervised training model may be used that includes a loss function that compares predictions of the event argument extraction network with ground truth training data. The term loss function refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly, and a new set of predictions are made during the next iteration.

In some embodiments, the negative log-likelihood (i.e., $L_{pred}$) is optimized to train the network model as follows:

$$\mathcal{L} = -P(y|D, a, t) \quad (10)$$

where y is the ground-truth argument role for the input example. The event argument extraction network is a multi-hop reasoning for event argument extractor with heterogeneous document structure types.

At operation 630, the system updates parameters of a neural network based on the loss function. In some cases, the operations of this step refer to, or may be performed by, a training component as described with reference to FIG. 3.

Evaluation of document-level event argument extraction models are conducted on the RAMS dataset (i.e., roles across multiple sentences). In some examples, the RAMS dataset includes 9,124 annotated event mentions across 139 types for 65 argument roles, which is the largest available dataset for document-level event argument extraction. The standard train/dev/test split and the evaluation scripts for RAM are used herein for comparison. Additionally, the event argument extraction network is evaluated on the BNB dataset for implicit semantic role labelling (iSRL), a closely related task to document-level event argument extraction where models predict the roles of argument candidates for a given predicate (the arguments and predicates can appear in different sentences in iSRL).

One or more embodiments of the present disclosure use a customized dataset based on the existing BNB dataset (with the same data split and pre-processing script) for comparison. In some examples, the dataset annotates 2,603 argument mentions for 12 argument roles (for 1,247 predicates or triggers). The development set of the RAMS dataset is used to fine-tune the hyper-parameters of the network model. After the fine-tuning process, the hyper-parameters used for a dataset (i.e., BNB) are 1e-5 for learning rate of the Adam optimizer, 32 for the mini-batch size, 30 dimensions for the position embeddings, 200 hidden units for the feed-forward network, a bidirectional LSTM (Bi-LSTM) and GCN layers, 2 layers for Bi-LSTM and GCN models (G=2), and C=3 channels for GTN with M=3 intermediate structures in each channel. One embodiment of the present disclosure considers GloVE (of 300 dimensions) and $BERT_{base}$ (of 768 dimensions) for the pre-trained word embeddings (updated during the training).

The event argument extraction network is compared with structure-free and structure-based baselines on the RAMS dataset. The structure-free baselines do not exploit document structures for event argument extraction. In some examples, the event argument extraction network is compared with a document level argument linking model (i.e., $RAMS_{model}$) and a head-word based approach (i.e., Head-based model). The $RAMS_{model}$ performs well for document-level event argument extraction on RAMS dataset.

A structure-based baseline employs document structures to learn representation vectors for input documents. However, existing technology fails to use document structure-based models for document-level event argument extraction. The event argument extraction network is compared with document structure-based models for a related task of document-level relation extraction (DRE) in information extraction. The structure-based baselines include the following four neural network models for DRE. In some examples, an interstitial dependency based neural network (iDepNN) uses the dependency trees of sentences to build document structures.

A graph convolutional neural network (GCNN) baseline generates document structures based on both syntax and discourse information (e.g., dependency trees, coreference links). GCNN may consider more than one source of information for document structures but fails to exploit the semantic-based document structures (for contextual and knowledge-based semantics) and lacks effective mechanisms for structure combination (i.e., do not use GTN). In a latent structure refinement (LSR) baseline, document structures are inferred from the representation vectors of the words (based exclusively on semantic information). A graph-based neural network extraction with edge-oriented graphs (EoG) generates the edge representations based on document structures. However, EoG considers syntax and discourse information for document structures and fails to exploit semantic-based document structures similar to GCNN. Some embodiments of the present disclosure adapt to the datasets for document-level event argument extraction.

The present disclosure considers a standard decoding, i.e., using argmax with P(.|D, a, t) to obtain the predicted roles, and the decoding setting where the model predictions are constrained to the permissible roles for the event type e evoked by the trigger word $w_t$. The role r* with the highest probability under P(.|D, a, t) is selected as the predicted role. Model performance on the RAMS test set using BERT and GloVe embeddings are recorded and evaluated. The event argument extraction network outperforms all the baselines in both the standard and type constrained decoding regardless of embeddings used (e.g., BERT or GloVe). The increased performance with p<0.01 demonstrates the effectiveness of the network model for document-level event argument extraction. The structure-based (e.g., GCNN, LSR and EoG) models outperform structure-free baselines. One of the reasons is that the structure-based models employ document structures for document-level event argument extraction. The event argument extraction network achieves increased performance because it includes contextual and knowledge-based structures with multi-hop heterogeneous reasoning in event argument extraction tasks.

The performance of the event argument extraction network is evaluated on the BNB dataset for iSRL. As the dataset involves a different train/dev/test split from the original BNB dataset, RAMS$_{model}$ is used as the baseline. The performance of the structure-based baselines (i.e., iDepNN, GCNN, LSR, and EoG) are recorded and evaluated. Performance of the models on the BNB test dataset (using BERT embeddings) are recorded and evaluated. The event argument extraction network achieves increased performance than all the baseline models (p<0.01).

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for natural language processing, comprising:
receiving a query about an event;
receiving a document comprising a plurality of words organized into a plurality of sentences, the words comprising an event trigger word corresponding to the event and an argument candidate word;
generating word representation vectors for the words by generating a first word representation vector for the event trigger word;
generating a second word representation vector for the argument candidate word;
generating a plurality of document structures including a semantic structure for the document based on the first word representation vector and the second word representation vector, a syntax structure based on a sentence-level dependency relationship, and a discourse structure representing document-level discourse information based on the plurality of sentences;
generating a relationship representation vector based on the plurality of document structures;
predicting, using a graph-based neural network, a relationship between the event trigger word and the argument candidate word based on the relationship representation vector; and
generating an answer to the query based on the predicted relationship between the event trigger word and the argument candidate word.

2. The method of claim 1, further comprising:
encoding the words of the document to produce individual word embeddings; and
identifying relative position of word pairs of the document to produce position embeddings, wherein the word representation vectors are based on the word embeddings and the position embeddings.

3. The method of claim 1, further comprising:
applying a long short-term memory (LSTM) to produce word embeddings and position embeddings; and
extracting a hidden vector from the LSTM to produce the word representation vectors.

4. The method of claim 1, further comprising:
receiving dependency tree information for the sentences of the document;
connecting the dependency tree information for the sentences to create a combined dependency tree; and
identifying a path between a pair of words of the combined dependency tree, wherein the syntax structure is generated based on the path.

5. The method of claim 1, further comprising:
applying a weighted matrix to each word representation vector of a pair of the word representation vectors to produce weighted word representation vectors; and
computing a semantic similarity score for the pair of the word representation vectors based on the weighted word representation vectors, wherein the semantic structure is based on the semantic similarity score.

6. The method of claim 1, further comprising:
mapping the words to corresponding nodes of a lexical database;
identifying a glossary for each of the corresponding nodes;
identifying node embeddings based on the glossary; and
computing a glossary similarity score for a pair of the node embeddings, wherein the semantic structure is based on the glossary similarity score.

7. The method of claim 1, further comprising:
mapping the words to corresponding nodes of a lexical database;
computing information content of the corresponding nodes, and a least common subsumer for a pair of the corresponding nodes; and
computing a structural similarity score for the pair of the corresponding nodes, wherein the semantic structure is based on the structural similarity score.

8. The method of claim 1, further comprising:
computing a boundary score for a pair of words based on whether the pair of words are both located in a same sentence, wherein the discourse structure is based on the boundary score.

9. The method of claim 1, further comprising:
identifying coreference information for words of the document; and
computing a coreference score for a pair of words based on whether the pair of words are located in sentences containing entity mentions that refer to a same entity of the coreference information, wherein the discourse structure is based on the coreference score.

10. The method of claim 1, further comprising:
generating a plurality of intermediate structures for each of a plurality of channels of a graph transformer network (GTN), wherein each of the intermediate structures comprises a weighted linear combination of the document structures; and
generating a hidden vector for each of the channels using a graph convolution network (GCN), wherein the relationship representation vector is generated based on the hidden vector for each of the channels.

11. The method of claim 1, further comprising:
applying a feed-forward neural network to the relationship representation vector; and applying a softmax layer to an output of the feed-forward neural network, wherein the relationship is predicted based on the output of the softmax layer.

12. An apparatus for natural language processing, comprising:
a document encoder configured to generate a first word representation vector for an event trigger word of a document corresponding to an event and a second word representation vector for an argument candidate word of the document, wherein the document comprising a plurality of words is organized into a plurality of sentences;
a structure component configured to generate a plurality of document structures including a semantic structure for the document based on the first word representation vector and the second word representation vector, a syntax structure based on a sentence-level dependency relationship, and a discourse structure representing document-level discourse information based on the plurality of sentences;
a relationship encoder configured to generate a relationship representation vector based on the plurality of document structures; and
a decoder comprising a graph-based neural network configured to predict a relationship between the event trigger word and the argument candidate word based on the relationship representation vector.

13. The apparatus of claim 12, wherein:
the document encoder comprises a word encoder, a position embedding table, and a long short-term memory (LSTM).

14. The apparatus of claim 12, wherein:
the structure component comprises a lexical database, a dependency parser, and a coreference network.

15. The apparatus of claim 12, wherein:
the relationship encoder comprises a graph transformer network (GTN) and a graph convolution network (GCN).

16. The apparatus of claim 12, wherein:
the decoder comprises a feed-forward layer and a softmax layer.

17. A method for training a neural network, comprising:
receiving training data including documents comprising a plurality of words organized into a plurality of sentences, the words comprising an event trigger word and argument words, and the training data further including ground truth relationships between the event trigger word and the argument words;
generating word representation vectors for the words;
generating a plurality of document structures including a semantic structure based on the word representation vectors, a syntax structure representing dependency relationships between the words, and a discourse structure representing discourse information based on the plurality of sentences;
generating relationship representation vectors based on the document structures;
predicting relationships between the event trigger word and the argument words based on the relationship representation vectors;
computing a loss function by comparing the predicted relationships to the ground truth relationships; and
updating parameters of a neural network based on the loss function.

18. The method of claim 17, wherein:
the updated parameters comprise parameters of a position embedding table used for generating the word representation vectors.

19. The method of claim 17, wherein:
the updated parameters comprise parameters of weight matrices used for generating the semantic structure.

20. The method of claim 17, wherein:
the updated parameters comprise weights for weighted linear combinations of the document structures used for generating the relationship representation vectors.

* * * * *